United States Patent
Cohen et al.

(10) Patent No.: US 10,201,785 B2
(45) Date of Patent: Feb. 12, 2019

(54) DEVICE FOR DISPENSING CARBONATED WATER

(71) Applicant: SodaStream Industries Ltd., Ben Gurion Airport (IL)

(72) Inventors: Avi Cohen, Jerusalem (IL); Allan Ring, Mercaz Shapira (IL); Alon Waisman, Ramat Gan (IL); Israel Baumberg, Ma'aleh Adumim (IL)

(73) Assignee: SodaStream Industries Ltd., Ben Gurion Airport (IL)

( * ) Notice: Subject to any disclaimer, the term of this patent is extended or adjusted under 35 U.S.C. 154(b) by 55 days.

(21) Appl. No.: 14/333,532

(22) Filed: Jul. 17, 2014

(65) Prior Publication Data
US 2015/0024088 A1  Jan. 22, 2015

Related U.S. Application Data

(60) Provisional application No. 61/847,582, filed on Jul. 18, 2013.

(51) Int. Cl.
  *B01F 3/04* (2006.01)
  *A23L 2/54* (2006.01)
  *B01F 13/02* (2006.01)

(52) U.S. Cl.
  CPC ............ *B01F 3/04808* (2013.01); *A23L 2/54* (2013.01); *B01F 3/04815* (2013.01);
  (Continued)

(58) Field of Classification Search
  CPC .. B01F 3/04808; B01F 3/04815; B01F 13/02; B01F 2003/04822; B01F 2003/04943;
  (Continued)

(56) References Cited

U.S. PATENT DOCUMENTS

| 4,850,269 A | * | 7/1989 | Hancock | ............ | B01F 3/04241 |
| | | | | | 261/140.1 |
| 5,124,088 A | * | 6/1992 | Stumphauzer | ....... | B67D 1/0057 |
| | | | | | 222/129.1 |

(Continued)

FOREIGN PATENT DOCUMENTS

| AU | 2008229713 | 10/2008 |
| CA | 2503423 | 10/2005 |

(Continued)

OTHER PUBLICATIONS

International Search Report for corresponding PCT application PCT/IB2014/063183 dated Dec. 12, 2014.

(Continued)

*Primary Examiner* — Stephen Hobson
(74) *Attorney, Agent, or Firm* — Pearl Cohen Zedek Latzer Baratz LLP

(57) ABSTRACT

A system and method is described for providing different levels of carbonated water on demand. The system includes a pressurized chamber to hold at least one of water and carbonated water, a gas canister to dispense carbon dioxide ($CO_2$) into the pressurized chamber, a controller to control the dispensing of the $CO_2$ according to level of carbonation required and a valve to vent excess gas from the pressurized chamber after carbonation.

10 Claims, 4 Drawing Sheets

(52) U.S. Cl.
CPC .......... *B01F 13/02* (2013.01); *A23V 2002/00* (2013.01); *B01F 2003/049* (2013.01); *B01F 2003/04822* (2013.01); *B01F 2003/04943* (2013.01); *B01F 2215/0022* (2013.01)

(58) Field of Classification Search
CPC ........ B01F 2215/0022; B01F 2003/049; A23L 2/54; A23V 2002/00
See application file for complete search history.

(56) References Cited

U.S. PATENT DOCUMENTS

| | | | | |
|---|---|---|---|---|
| 5,139,708 | A * | 8/1992 | Scott | B01F 3/04808 222/1 |
| 5,413,742 | A * | 5/1995 | Gatter | B01F 3/04787 222/146.6 |
| 5,443,763 | A * | 8/1995 | Notar | B01F 3/04808 261/140.1 |
| 5,499,741 | A * | 3/1996 | Scott | B67D 1/0039 222/129.4 |
| 5,839,291 | A * | 11/1998 | Chang | B67D 1/0054 62/126 |
| 7,266,974 | B2 * | 9/2007 | Schroeder | B01F 3/04808 222/146.6 |
| 7,470,364 | B2 | 12/2008 | Oranski et al. | |
| 7,703,382 | B2 | 4/2010 | Oranski et al. | |
| 7,987,769 | B2 | 8/2011 | Oranski et al. | |
| 2004/0124548 | A1 * | 7/2004 | Rona | B01F 3/04531 261/64.3 |
| 2006/0112831 | A1 * | 6/2006 | Greenwald | A47J 31/465 99/275 |
| 2009/0121364 | A1 * | 5/2009 | Scott | B01F 3/04808 261/38 |
| 2011/0084096 | A1 * | 4/2011 | Schroeder | B67D 1/0054 222/146.6 |
| 2011/0168736 | A1 * | 7/2011 | Finlay | B67D 1/0456 222/1 |
| 2011/0215112 | A1 | 9/2011 | Bar | |
| 2012/0078414 | A1 * | 3/2012 | Brown | B67D 1/0888 700/244 |
| 2012/0177784 | A1 * | 7/2012 | Malagi | A23L 2/54 426/67 |
| 2014/0004240 | A1 * | 1/2014 | Hatherell | A23L 2/54 426/477 |
| 2014/0004241 | A1 * | 1/2014 | Hatherell | B01F 3/04794 426/477 |
| 2014/0070431 | A1 * | 3/2014 | Hatherell | B67D 1/0057 261/30 |
| 2014/0079856 | A1 * | 3/2014 | Hatherell | A23L 2/54 426/477 |
| 2014/0099405 | A1 * | 4/2014 | Boarman | B67D 1/0071 426/67 |
| 2014/0331867 | A1 * | 11/2014 | Novak | B65D 85/73 99/323.2 |
| 2015/0183627 | A1 * | 7/2015 | Tansey, Jr. | A47J 31/44 426/416 |
| 2016/0304820 | A1 * | 10/2016 | Osborn | C12C 11/11 |
| 2017/0203264 | A1 * | 7/2017 | Bona | B01F 3/04808 |

FOREIGN PATENT DOCUMENTS

| | | | | |
|---|---|---|---|---|
| CA | 2793891 | | 10/2005 | |
| EP | 2070586 | | 6/2009 | |
| EP | 2070586 | A1 * | 6/2009 | ............... A23L 2/54 |
| KR | 101608872 | B1 * | 4/2016 | ............... A23L 2/54 |
| KR | 20160040923 | A * | 4/2016 | |
| WO | WO-2009043088 | A1 * | 4/2009 | ............... A23L 2/40 |
| WO | 2012110887 | | 8/2012 | |
| WO | WO-2016114490 | A1 * | 7/2016 | ............... A23L 2/54 |

OTHER PUBLICATIONS

Extended European Search Report for corresponding EP application 14 82 6023.5 dated Dec. 23, 2016.

* cited by examiner

DEVICE FOR DISPENSING CARBONATED WATER

CROSS-REFERENCE TO RELATED APPLICATIONS

This application claims benefit from U.S. Provisional Patent Application No. 61/847,582, filed 18 Jul. 2013, which is hereby incorporated in its entirety by reference.

FIELD OF THE INVENTION

The present invention relates to water dispensers and to carbonated water dispensers in particular.

BACKGROUND OF THE INVENTION

There are many water dispensers on the market today that dispense both hot and cold water for drinking. The water dispensed is either mineral or filtered and treated against pathogens. Some of the above mentioned dispensers also contain features to dispense carbonated or sparkling water. Current dispensers provide carbonation in the range of 3-4 g of carbon dioxide per liter of water.

SUMMARY OF THE INVENTION

There is provided, in accordance with a preferred embodiment of the present invention, a system for providing different levels of carbonated water on demand. The system includes a pressurized chamber to hold at least one of water and carbonated water; a gas canister to dispense carbon dioxide ($CO_2$) into the pressurized chamber; a controller to control the dispensing of the $CO_2$ according to level of carbonation required and a valve to vent excess gas from the pressurized chamber after carbonation Moreover, in accordance with a preferred embodiment of the present invention, the system may include a water pump to cause turbulence within the pressurized chamber.

Further, in accordance with a preferred embodiment of the present invention, the system may include an activator to activate the water pump according to pre-defined times to obtain the different levels of carbonated water.

Still further, in accordance with a preferred embodiment of the present invention, the system may include a carbonation tube and a valve to enable pulsing of the $CO_2$ into the chamber at high pressure via the carbonation tube.

Additionally, in accordance with a preferred embodiment of the present invention, the system may include a dispensing valve and dispensing tube to enable dispensing of carbonated water via gravity.

Moreover, in accordance with a preferred embodiment of the present invention, the system may include an air pump, a dispensing valve and dispensing tube to enable dispensing of the carbonated water.

Further, in accordance with a preferred embodiment of the present invention, the dimensions of the dispensing tube ensure minimum disturbance during the dispensing of the carbonated water.

Further, in accordance with a preferred embodiment of the present invention, the system may include an additional chamber to store vented excess $CO_2$ for re-use.

There is provided, in accordance with a preferred embodiment of the present invention, a method for providing different levels of carbonated water on demand. The method includes dispensing $CO_2$ into a pressurized chamber; controlling the dispensing of the $CO_2$ according to the level of carbonation required and venting excess gas from the pressurized chamber after carbonation.

Moreover, in accordance with a preferred embodiment of the present invention, the method may include causing turbulence within the pressurized chamber using a water pump.

Further, in accordance with a preferred embodiment of the present invention, the method may include activating the water pump according to pre-defined times to obtain the different levels of carbonated water.

Still further, in accordance with a preferred embodiment of the present invention, the method may include pulsing the $CO_2$ into the chamber at high pressure via a carbonation tube.

Still further, in accordance with a preferred embodiment of the present invention, the method may include dispensing the carbonated water via gravity.

Additionally, in accordance with a preferred embodiment of the present invention, the method may include dispensing the carbonated water using an air pump.

Moreover, in accordance with a preferred embodiment of the present invention the method may include storing vented excess $CO_2$ for re-use.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
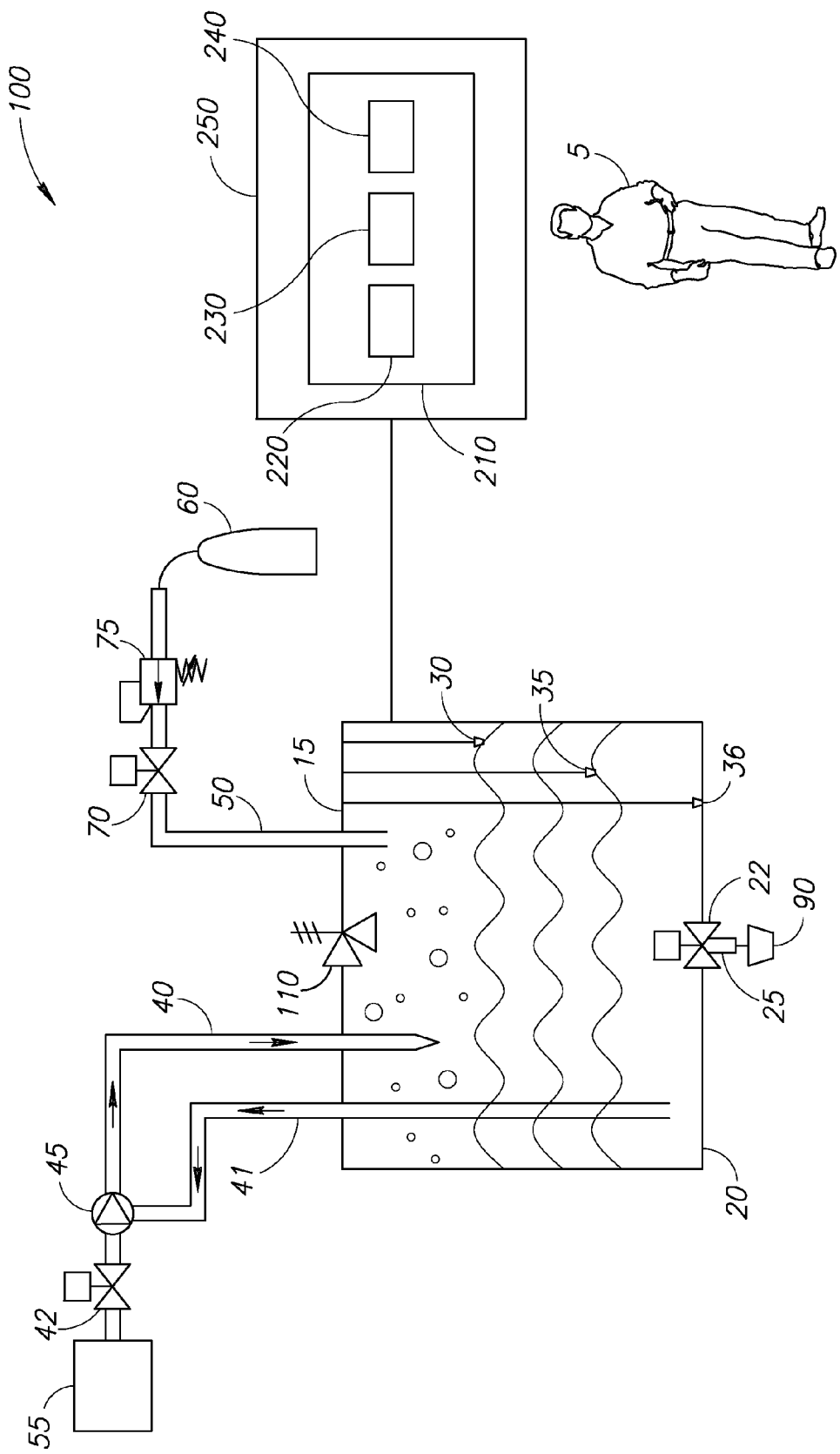
FIGS. 1A and 1B are schematic illustrations of a system for carbonating water at different levels, in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that, to many people, the existing level of carbonation provided by dispensing systems may be considered "weak" and that it is possible to create a "stronger" carbonation in the range of 7-10 g of carbon dioxide ($CO_2$) per liter of water. Applicants have also realized that this variation in conception of what constitutes "weak" as opposed to "strong" may vary from culture to culture.

Conventional carbonation of water involves adding $CO_2$ to water in a sealed environment. Henry's Law states that at a constant pressure over time, the amount of a given gas that can dissolve in a given type and volume of liquid is directly proportional to the partial pressure of that gas in equilibrium with that liquid and temperature. Therefore, the higher the pressure of the gas above the liquid (in this case, the water), the greater the $CO_2$ absorption.

Applicants have realized that one way of increasing the dissolve rate of the $CO_2$ within the water at a given pressure, is to create turbulence within a sealed environment to ensure maximum contact between the $CO_2$ molecules and the water molecules. Reference is now made to FIG. 1A which illustrates a system 100 for carbonating water at different levels in accordance with a preferred embodiment of the present invention. It will be appreciated that system 100 may be used as an add-on to a typical hot/cold water dispenser.

System 100 comprises a mixing chamber 20, a lid 15, a dispensing valve 22, a dispensing tube 25, a higher water level sensor 30, a lower level water sensor 35, a secondary lower level water sensor 36, a water pipe 40, a return water pipe 41, a water control valve 42, a gas inlet 50, a circulation pump 45, a water supply 55, a gas canister 60, a gas control valve 70, a pressure regulator 75 and a venting valve 110.

Water may be added to chamber 20 from water supply 55 via water control valve 42 and water pipe 40. Water level sensors 30, 35 and 36 may be used to keep track of minimum and maximum levels of water/carbonated water within chamber 20 as described in more detail herein below. Gas canister 60, which may typically be used with conventional home carbonation systems and which may typically dispense $CO_2$ at a pressure of approx. 60 bars, may supply the required amount of $CO_2$ via gas control valve 70, pressure regulator 75 and gas inlet 50 for the carbonation process. Pressure regulator 75 may control the pressure of $CO_2$ and may ensure that the $CO_2$ is added to chamber 20 to a constant pressure of approximately 8 bars. The ready carbonated water may be dispensed to a user via dispensing valve 22 and dispensing tube 25 into a cup 90. It will be appreciated that chamber 20 may be at room temperature and may typically be external from any heating/cooling mechanisms used within the pertinent hot/cold drink dispenser. In an alternative embodiment, chamber 20 may be situated within the refrigeration element of the pertinent drink dispenser.

It will be further appreciated that a user 5 may have the option to pick two or more levels of carbonated water to be dispensed into cup 90 via appropriate buttons which may be made available via a control panel as part of the pertinent drink dispenser to which it is associated. System 100 may be connected to a control module 250 which may comprise a control panel 210. Control panel 210 may comprise buttons 220, 230 and 240. User 5 may select either high or low carbonated water via buttons 220 and 230 respectively. It will be appreciated that, for this example only, the range of available carbonation levels is two. However, more than two options may also be offered. Carbonated water may be automatically dispensed at the end of the carbonation process. In an alternative embodiment, control panel 210 may also comprise a dispense button 240 for user 5 to dispense his drink once the carbonation process has finished.

Once user 5 has made his selection, control module 250 may instruct water control valve 42 to release water into chamber 20 via water pipe 40. The water may enter chamber 20 via the refrigeration system of the pertinent drink dispenser. It will be appreciated that the colder the water, the stronger the level of carbonation that can be achieved. When chamber 20 is full to maximum capacity as determined by higher water level sensor 30, control module 250 may instruct water control valve 42 to stop the water supply. Once the water supply has been turned off, control module 250 may instruct gas control valve 70 to release gas from gas canister 60 into chamber 20 via gas pipe 50. It will be appreciated that once added to a water filled chamber 20, $CO_2$ may sit on top of the water level in a "cushion" like form while it slowly dissolves into the water as described herein above. Once chamber 20 is filled with water and $CO_2$, control module 250 may instruct pump 45 to cycle water in and out of chamber 20 via pipes 40 and 41 at a controlled rate It will be appreciated that pump 45 may typically be a standard water pump and may cause turbulence within the water in chamber 20 by pushing water through it. It will be further appreciated that as the carbonation process of the water in chamber 20 progresses, it is also carbonated water that is cycled until the process is stopped when the desired level of carbonation is achieved.

It will also be appreciated that when pump 45 is inactive, water may still flow through it to from water supply 55 to chamber 20. Since water is injected into chamber 20 above the maximum water level, it may hit the water present in chamber 20 at a high velocity which may cause turbulence within the water. The orifice of water pipe 40 may also be narrow to increase the line velocity of the water entering chamber 20. It will be further appreciated that the turbulence created within chamber 20 may cause the water to "splash". The splashing water may run through the "cushion" of gas, improving the contact between the water and the gas molecules and therefore increase $CO_2$ absorption and the level of carbonation. Once the required level of carbonation has been obtained, control module 250 may switch off pump 45 and instruct gas control valve 70 to stop the flow of $CO_2$ from gas canister 60.

In an alternative embodiment, $CO_2$ may be pulsed into chamber 20 before the water is added. It will be appreciated that in this scenario, water may be cycled through the "cushion" of $CO_2$ which may be formed in chamber 20 as described herein above.

It will also be appreciated that the level of carbonation obtained may be directly proportional to the amount of time that pump 45 is activated and therefore the desired carbonation level may be pre-set by setting the pumping time of pump 45. Carbonated water may be dispensed to cup 90 via dispensing valve 22 and dispensing tube 25 as described in more detail herein below.

Once the carbonation process has ended. Controller 250 may instruct dispensing valve 22 to dispense the required amount of carbonated water into cup 90 via dispensing tube 25. It will be appreciated that once the carbonation process has ended; pressurized $CO_2$ may remain in chamber 20. It will be further appreciated that this excess gas may also cause "splashing" when the carbonated water is dispensed to cup 90 via dispensing tube 25, as excess gas is released together with the carbonated water. Applicants have realized that the addition of a venting valve 110 to vent excess $CO_2$ from chamber 20 before the carbonated water is dispensed may prevent this splashing.

It will be appreciated that venting valve 110 may also be controlled by controller 250. Before carbonated water is dispensed, controller 250 may instruct venting valve 110 to open to release the excess $CO_2$. Venting valve 110 may then be closed to ensure that chamber 20 remains sealed to preserve the carbonation level after the carbonated water is dispensed.

It will be appreciated that that chamber 20 may be situated in an optimal position to allow for the flow of carbonated water through dispensing tube 25 via valve 22 into cup 90 via gravity. It will also be appreciated that venting valve 110 when open, may prevent a vacuum from developing in chamber 20 which in turn may prevent the natural flow of carbonated water out of chamber. The dispensation of carbonated water through a very small orifice may also reduce the carbonation level of the water. Therefore, in accordance with a preferred embodiment of the present invention, the wider and shorter the dimensions of dispensing tube 25 are, the higher the level of carbonation in the dispensed water will be. An exemplary interior diameter of dispensing tube 25 may be at least 8 mm.

Figure 1B:
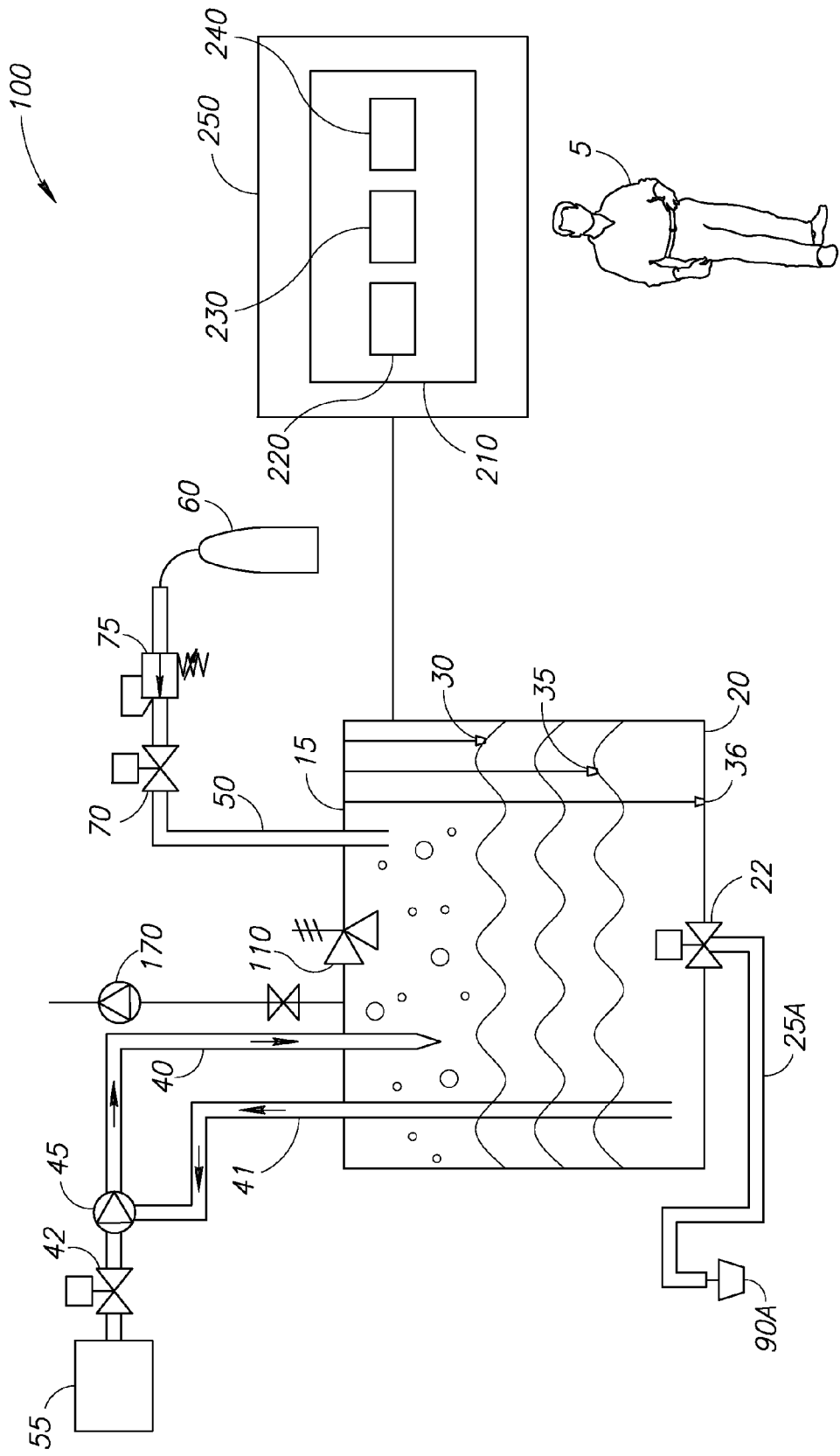

In an alternative embodiment to the present invention as is illustrated in FIG. 1B to which reference is now made, dispensing tube 25 may not necessarily be fully positioned below chamber 20 and thus carbonated water may not automatically flow into cup 90 via gravity as shown in FIG. 1B to which reference is now made. A small air pump 170 may be added to system 100 to build up the pressure in chamber 20 and to aid the flow of carbonated water through dispensing valve 22 and dispensing tube 25A and into cup 90A. It will be appreciated that in this scenario, control panel 250 may instruct venting valve 110 to open and then reclose to vent the excess gas and then may activate pump 170.

It will be appreciated that chamber 20 may be compared to a sealed carbonated drink bottle which retains its fizz until it is opened and that when all pertinent valves are closed, chamber 20 may be entirely sealed by lid 15. It will also be appreciated that once carbonated water is dispensed and the amount of carbonated water decreases within chamber 20, the carbonation level of the contained carbonated water may also decrease. It will be further appreciated that there may be two minimum sensors 35 and 36, one to measure the minimum liquid level in chamber 20 which may determine whether there is enough carbonated water contained to fill a pre-determined minimum request such as a cup full and a secondary sensor to ensure that the liquid level is not so low that only $CO_2$ will be dispensed and not carbonated water.

It will also be appreciated that each time a request is made for carbonated water (at whatever level), control module 250 may check the sensor readings to ensure that there is enough carbonated water to be dispensed. If a request for low carbonated water is made and there is enough carbonated water left in chamber 20 then the carbonated water within is dispensed. If not, controller 250 may instruct water control valve 42 to refill chamber 20 with water and to reactivate the carbonation process.

It will be appreciated that all settings and limits used by controller 250 may be preset by the manufacturer.

Figure 2:
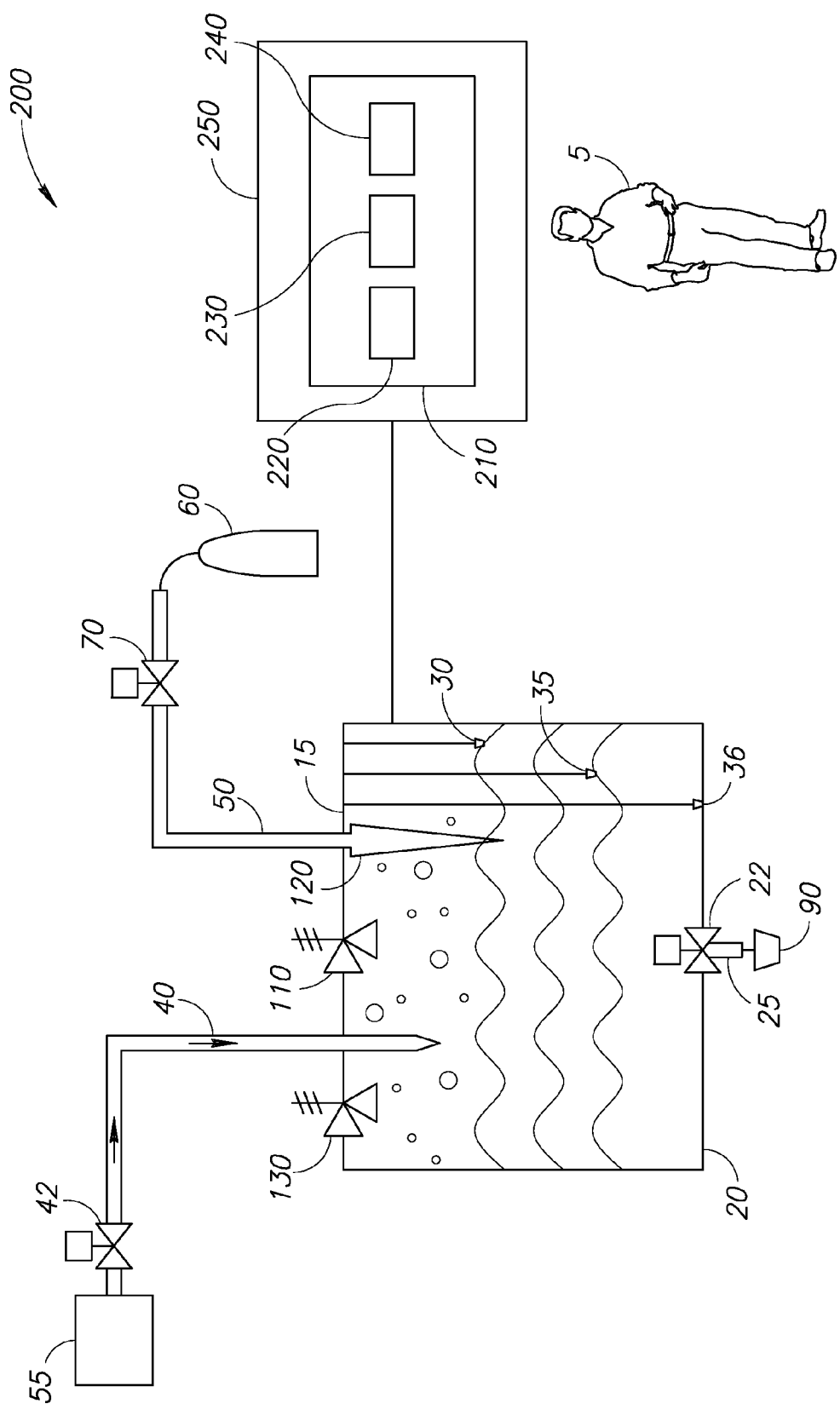
FIG. 2 is a schematic illustration of an alternative embodiment to the system of FIGS. 1A and 1B, in accordance with a preferred embodiment of the present invention.

In an alternative embodiment to the present invention, Applicants have realized that the level of carbonation may also be increased by increasing the amount of the $CO_2$ that is added to a water filled chamber 20. Reference is now made to FIG. 2 which illustrates an alternative system 200 for carbonating water at different levels in accordance with a preferred embodiment of the present invention. System 200 is similar to system 100 and comprises similar elements marked by the same reference numerals. It will be appreciated that unlike system 100, system 200 does not create water turbulence using pump 45 but instead comprises a carbonating tube 120. $CO_2$ from gas canister 60 may be "pulsed" using gas control valve 70 into chamber 20. It will be appreciated that an exhaust valve 130 may also be added to chamber 20 to ensure that the pressure of chamber 20 does not exceed approximately 8 bars.

Once user 5 has made his strength of carbonation request, control module 250 may instruct gas control valve 70 to pulse $CO_2$ into chamber 20 via gas inlet 50 and carbonating tube 120. Carbonating tube 120 may allow for a high pressure injection of $CO_2$ directly into the water contained in chamber 20 to speed up reaction time. It will be appreciated that, in this scenario, chamber 20 must be able to withstand a high pressure of up to approximately 8 bars and that that level of carbonation is proportional to the amount of $CO_2$ dispensed. Once the required level of carbonation has been obtained, control module 250 may instruct gas control valve 70 to stop the flow of $CO_2$ from gas canister 60.

It will be appreciated that for system 200, carbonated water may be dispensed by either method as described herein above.

Figure 3:
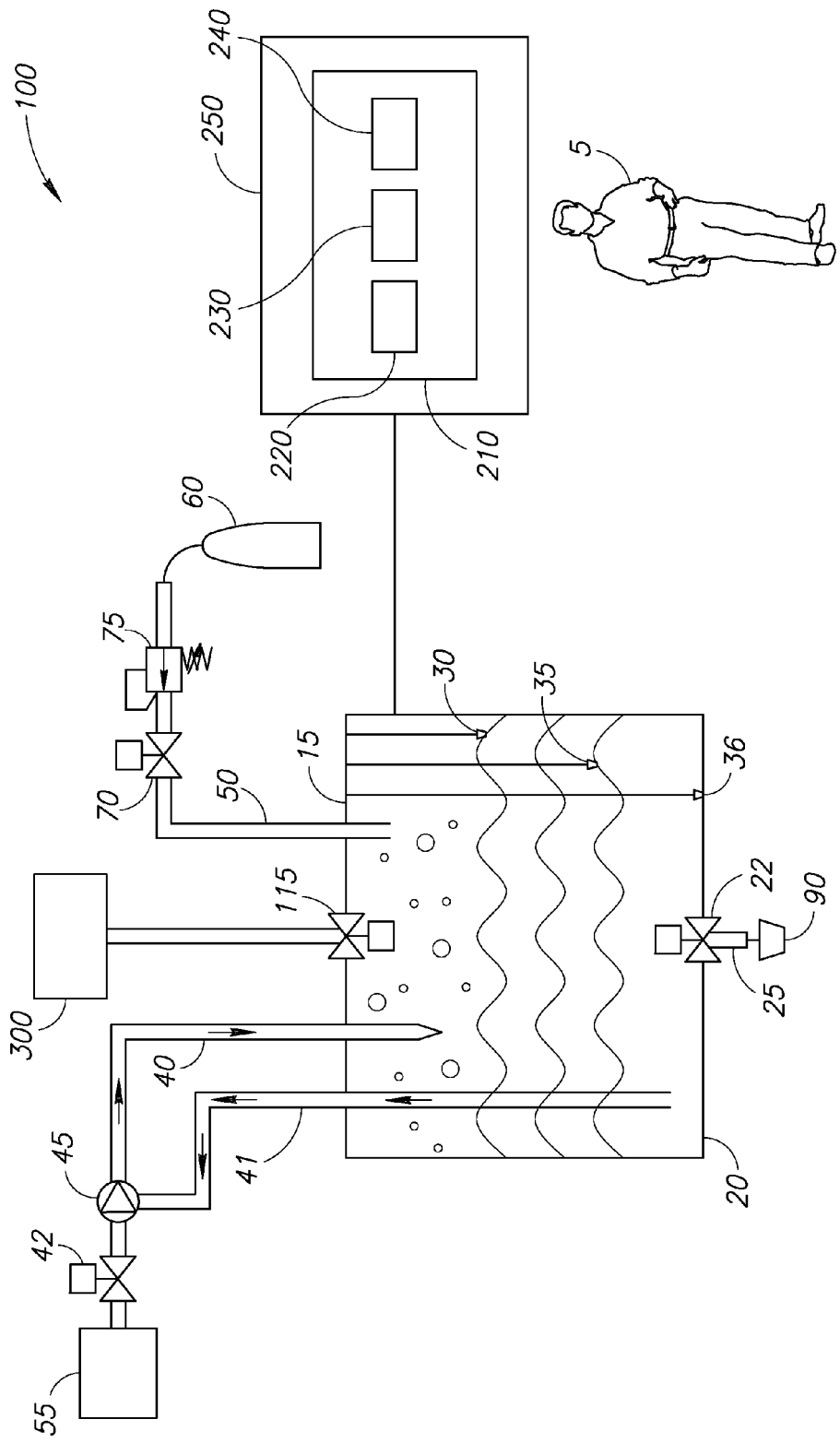
FIG. 3 is a schematic illustration of an additional embodiment of the systems of FIGS. 1A, 1B and 2, in accordance with a preferred embodiment of the present invention.

In an alternative embodiment to the present invention, excess $CO_2$ that is present in chamber 20 after the carbonation process may be vented via a 3-way valve 115 to allow the pressure of the $CO_2$ to enter a secondary chamber 300 for re-use as is illustrated in FIG. 3, to which reference is now made. Chamber 300 may be totally sealable in order to contain the $CO_2$ being held. It will be appreciated that secondary chamber 300 may also be used together with system 200. It will be further appreciated that in this scenario when carbonation is requested by user 5, controller 250 may be programmed to open 3-way valve 115 and dispense the $CO_2$ held within chamber 300 into chamber 20 before $CO_2$ from canister 60 is added. The amount of $CO_2$ dispensed from gas canister 60 via regulator 75 or by gas control valve 70 (depending on which system is in use) may make up the difference for the total amount of $CO_2$ required. It will be appreciated, that in this way, a maximum of 25% of the excess gas may be preserved. It will also be appreciated that when 3-way valve 115 is open between chambers 20 and 300, the pressure in both chambers 20 and 300 may be equal. Once 3-way valve 115 has been closed to contain the $CO_2$ in chamber 300, control module 250 may instruct it to reopen between chamber 20 and the atmosphere to vent any remaining pressure in chamber 20.

Thus, systems 100 and 200 may provide for the production of different levels of carbonated water which may be dispensed in a safe, clean and efficient manner. They may also provide a higher level of carbonation than that provided by current systems. The use of both systems together with chamber 300 may also provide the option of recycling $CO_2$, resulting in less waste and more efficiency from a single gas canister, which, in turn, may also ensure a longer life span for the pertinent gas canister in use.

It will also be appreciated that although described herein above for use with a hot/cold water dispenser, both systems 100 and 200 together with any additional features may also be used in conjunction with refrigerators with the capability of cold water dispensing and ice making.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. A system for providing different levels of carbonated water on demand, the system comprising:
   a pressurized chamber to hold at least one of water and carbonated water;
   a gas canister to dispense carbon dioxide ($CO_2$) into said pressurized chamber;
   a water pump to cycle said at least one of water and carbonated water in and out of said pressurized chamber;
   a controller to control said dispensing of said $CO_2$ according to one of a plurality of pre-defined levels of carbonation, wherein said controller switches off said water pump and stops the flow of $CO_2$ from said gas canister once a required level of carbonation has been obtained;
   an activator to activate said water pump according to pre-defined times to meet said demand at one of said pre-defined levels of carbonation; and
   a valve to vent excess gas from said pressurized chamber after carbonation.

2. The system according to claim 1 and comprising a dispensing valve and dispensing tube to enable dispensing of carbonated water via gravity.

3. The system according to claim 1 and comprising an air pump, a dispensing valve and dispensing tube to enable dispensing of said carbonated water.

4. The system according to claim 1 and also comprising an additional chamber to store vented excess $CO_2$ for re-use.

5. The system according to claim 1 and also comprising a carbonation tube and a valve to enable pulsing of said $CO_2$ into said chamber at high pressure via said carbonation tube.

6. The system according to claim 5 and comprising a dispensing valve and dispensing tube to enable dispensing of carbonated water via gravity.

7. The system according to claim 6 wherein an interior diameter of said dispensing tube is at least 8 mm.

8. The system according to claim 5 and comprising an air pump, a dispensing valve and dispensing tube to enable dispensing of said carbonated water.

9. The system according to claim 8 wherein an interior diameter of said dispensing tube is at least 8 mm.

10. The system according to claim 5 and also comprising an additional chamber to store vented excess $CO_2$ for re-use.

* * * * *